US012705097B2

(12) United States Patent
Acuna Blanco et al.

(10) Patent No.: US 12,705,097 B2
(45) Date of Patent: Aug. 11, 2026

(54) PRIORITIZATION OF DEPENDENT TASKS BASED ON ERROR RATES

(71) Applicant: International Business Machines Corporation, Armonk, NY (US)

(72) Inventors: Nestor Acuna Blanco, Stuttgart (DE); Radu Marinescu, Castleknock (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 413 days.

(21) Appl. No.: 18/544,660

(22) Filed: Dec. 19, 2023

(65) Prior Publication Data

US 2025/0156220 A1 May 15, 2025

(30) Foreign Application Priority Data

Nov. 15, 2023 (GB) ..................................... 2317472

(51) Int. Cl.
*G06F 9/46* (2006.01)
*G06F 9/48* (2006.01)

(52) U.S. Cl.
CPC .................................. *G06F 9/4881* (2013.01)

(58) Field of Classification Search
None
See application file for complete search history.

(56) References Cited

U.S. PATENT DOCUMENTS 7,840,844 B2 * 11/2010 Garland ................ G06F 11/263 717/124
9,489,289 B2 11/2016 Hu
9,715,441 B2 7/2017 Rajamanickam
(Continued)

FOREIGN PATENT DOCUMENTS

CN 102289408 B 12/2013
CN 109379216 A 2/2019
(Continued)

OTHER PUBLICATIONS

Authors et. al.: Disclosed Without Attribution. IP.com No. IPCOM000273779D. "A System and Method for Test Automation Throughput Optimisation", Feb. 16, 2024, 5 pages.
(Continued)

*Primary Examiner* — Bing Zhao
(74) *Attorney, Agent, or Firm* — Rakesh Roy

(57) ABSTRACT

A method for dependent task prioritization is disclosed. The method comprises providing base data comprising task identifiers, failure values and dependency data values, where each dependency data value is associated with a pair of tasks. The method comprises also generating a probabilistic model, using a directed acyclic graph, where each task is associated with a network node, and where each dependency data value is associated with a network edge of the directed acyclic graph, wherein each dependency data value is indicative of a conditional probability in relation to the respective failure rate per time unit. Additionally, the method comprises determining for each task in the acyclic directed graph a posterior marginal probability value indicative of a probability of a failure of the task, and selecting, based upon the posterior marginal probability values, a sequence of tasks that is likely to fail fastest.

20 Claims, 12 Drawing Sheets

(56) References Cited

U.S. PATENT DOCUMENTS

| | | | |
|---|---|---|---|
| 10,578,673 B2 | 3/2020 | Ranganathan | |
| 10,983,902 B2 | 4/2021 | Akbulut | |
| 11,132,288 B2 | 9/2021 | Gefen et al. | |
| 11,561,850 B1 | 1/2023 | Banerjee et al. | |
| 2008/0256392 A1 | 10/2008 | Garland | |
| 2024/0220402 A1 | 7/2024 | Chen et al. | |

FOREIGN PATENT DOCUMENTS

| | | |
|---|---|---|
| CN | 110990291 A | 4/2020 |
| CN | 110825621 B | 5/2021 |
| GB | 2636066 A | 6/2025 |
| WO | 2022/224266 A1 | 10/2022 |
| WO | 2023/214418 A1 | 11/2023 |
| WO | 2025/103956 A1 | 5/2025 |

OTHER PUBLICATIONS

Blanco et al., "Scheduling of Tasks Using a Bayesian Network", U.S. Appl. No. 19/078,530, filed Mar. 13, 2025, 26 Pages.

Boutselis et al. Using Bayesian Networks to Forecast Spares Demand from Equipment Failures in a Changing Service Logistics Context, International Journal of Production Economics, Mar. 2019, pp. 325-333, vol. 209.

Daultani et al. Inclusive Risk Modelling for Manufacturing Firms: A Bayesian Network Approach, Journal of Intelligent Manufacturing, Dec. 2019, 34 pages.

Felipe et al. An Approach Based on Bayesian Network for Improving Project Management, Computers in Industry, Aug. 2020, 13 pages, vol. 119.

Ifechukwu et al. Monitoring Uncertainty in Project Completion Times: A Bayesian Network Approach, Department of Engineering Management and Systems Engineering, The George Washington University, 800 22nd Street NW, Suite 2800, Washington, DC 20052, USA, 2015, 29 pages.

Khodakarami et al. Project scheduling: improved approach to incorporate uncertainty using bayesian networks, Project Management Journal, Jun. 2007, pp. 39-49, vol. 38, Issue No. 2.

Kokkeler Carljin. Project Management Method Selection using Bayesian Networks: a Novel Approach, 2021, 9 pages.

Liu et al. Auditing Data Reliability in International Logistics: An Application of Bayesian Networks. Department of Technology and Operations Management, Apr. 2014, pp. 707-712.

Nagox. "pgmpy/pgmpy", retrieved from web https://github.com/pgmpy/pgmpy, dated May 29, 2025, 4 pages.

Nguyen et al. Risk Mangement in Agile Software Project Iteration Scheduling Using Bayesian Networks, New Trends in Intelligent Software Methodologies, Tools and Techniques, Dec. 2018, 12 pages.

Shevtshenko et al. Decision support under uncertainties based on robust Bayesian networks in reverse logistics management. International Journal of Computer Applications in Technology, Sep. 3, 2009, 12 pages, vol. 36, No. 3-4.

Tri Joko Wahyu Adi. Probabilistic Scheduling Based on Hybrid Bayesian Nework—Program Evaluation Review Technique, The Journal for Technology and Science, May 2023, 10 pages.

Xu et al. DEA Evaluation Method Based on Interval Intuitionistic Bayesian Network and Its Application in Enterprise Logistics, IEEE Access, Jul. 17, 2019, 13 pages.

Zheng et al. Operational risk modelling for cold chain logistics system: a Bayesian network approach, Kybernetes ahead-of-print(ahead-of-print), Mar. 2020, 19 pages.

Bai et al., "Software failure prediction based on a Markov Bayesian network model", Journal of Systems and Software, vol. 74, Issue 3, Feb. 1, 2005, pp. 275-282.

International Searching Authority, "Notification of Transmittal of the International Search Report and the Written Opinion of the International Searching Authority, or Declaration," Patent Cooperation Treaty, Feb. 21, 2025, 12 pages, International Application No. PCT/ EP2024/081900.

Castro et al., "Learning Bayesian Networks to Perform Feature Selection", Proceedings of International Joint Conference on Neural Networks, Atlanta, Georgia, USA, Jun. 2009, 7 pages.

Huang et al., "Emerging Intelligent Computing Technology and Applications", With Aspects of Artificial Intelligence, 5th International Conference on Intelligent Computing, ICIC 2009 Ulsan, South Korea, Sep. 2009, 12 pages.

Intellectual Property Office, Patents Act 1977: Search Report under Section 17(5), Jul. 23, 2025, 4 Pages, GB Application No. 2501335.0.

W. Dong et al., "Automating Software FMEA via Formal Analysis of Dependence Relations", Annual IEEE International Computer Software and Applications Conference, Jul. 2008, 2 pages.

Fenton, Norman & Neil, Martin. (2004). Combining Evidence in Risk Analysis using Bayesian Networks. Safety Critical Systems Newsletter. 14. 8-13. https://www.researchgate.net/publication/236944377_Combining_Evidence_in_Risk_Analysis_using_Bayesian_Networks#fullTextFileContent.

Haidry, S. et al., "Using Dependency Structures for Prioritization of Functional Test Suites," in IEEE Transactions on Software Engineering, vol. 39, No. 2, pp. 258-275, Feb. 2013, doi: 10.1109/TSE.2012.26.

Indumathi, C. P., & Selvamani, K. (2015). Test Cases Prioritization Using Open Dependency Structure Algorithm. Procedia Computer Science, 48, 250-255. doi:10.1016/j.procs.2015.04.178.

J. Joo, S. Yoo and M. Park, "Poster: Test Case Prioritization Using Error Propagation Probability," 2020 IEEE 13th International Conference on Software Testing, Validation and Verification (ICST), Porto, Portugal, 2020, pp. 398-401, doi: 10.1109/ICST46399.2020.00047.

Jambor, S. (2021) "systemd by example—Part 2: Dependencies," https://seb.jambor.dev/posts/systemd-by-example-part-2-dependencies/ <Retrieved Dec. 6, 2023>.

Mahdieh, M., Mirian-Hosseinabadi, S.-H., Etemadi, K., Nosrati, A., & Jalali, S. (2020). Incorporating fault-proneness estimations into coverage-based test case prioritization methods. Information and Software Technology, 121, 106269. doi:10.1016/j.infsof.2020.106269.

Mirarab, S., Tahvildari, L. (2007). A Prioritization Approach for Software Test Cases Based on Bayesian Networks. In: Dwyer, M.B., Lopes, A. (eds) Fundamental Approaches to Software Engineering. FASE 2007. Lecture Notes in Computer Science, vol. 4422. Springer, Berlin, Heidelberg. https://doi.org/10.1007/978-3-540-71289-3_22.

Zhang, T., Wang, X., Wei, D., & Fang, J. (2018). Test Case Prioritization Technique Based on Error Probability and Severity of UML Models. International Journal of Software Engineering and Knowledge Engineering, 28(06), 831-844. doi:10.1142/S0218194018500249.

Qiu et al., "Failure Rate Minimization with Multiple Function Unit Scheduling for Heterogeneous WSNs," 2008 IEEE Global Telecommunications Conference, pp. 1-5.

Search Report, Intellectual Property Office, Application No. GB2317472.5, Apr. 30, 2024, 3 pgs.

* cited by examiner

304

| B | C | D | P(D\|B, C) |
|---|---|---|---|
| F | F | F | 1.0 |
| F | F | S | 0.0 |
| F | S | F | 1.0 |
| F | S | S | 0.0 |
| S | F | F | 1,0 |
| S | F | S | 0.0 |
| S | S | F | 0.04 |
| S | S | S | 0.96 |

S = Success; F = Failure

600

| task | probability | dependency |
|---|---|---|
| A | 0.1 | [] |
| B | 0.7 | [A] |
| C | 0.3 | [A] |
| D | 0.6 | [B, C] |
| E | 0.8 | [A,B] |

604

1000

| task | probability | dependency |
|---|---|---|
| A | 0.1 | [] |
| B | 0.7 | [A] |
| C | 0.3 | [A] |
| D | 0.6 | [B, C] |
| E | 0.8 | [A,B] |

604

PRIORITIZATION OF DEPENDENT TASKS BASED ON ERROR RATES

BACKGROUND

Field of the Invention

Aspects of the invention relate generally to a method for a controlling of tasks, and more specifically, to a computer-implemented method for a prioritizing dependent tasks. The invention aspects relate further to a related dependent task prioritization for a prioritization of dependent tasks, and a related computer program product.

Related Art

Computer systems and especially their software applications (as well as operating system components) are modularized to a large degree these days. In more and more cases, services running on different servers and cloud environments need to work together to ensure a good user experience. Testing such systems—be it the new developments or only component upgrades—becomes increasingly challenging because there are so many dependencies between the different software components. Therefore, test case prioritization—i.e., the process of ordering the execution of test cases to achieve a higher defect detection rate—is becoming increasingly important. This is because test case prioritization aims to balance between two important constraints, namely time and budget in software testing and development in order to detect errors as soon as possible. The sooner an error and software code can be identified and eliminated, the faster reliable software can be developed. This becomes a competitive advantage for producers of standard software as well as for IT departments in enterprises and consulting firms.

But, also for other components that depend on each other in many permutations, it may be advantageous to identify those alternatives as quickly as possible in order to save computing resources. Examples may be natural language processing (NLP) or autonomous driving. Also here, it is important to deselect alternatives with a lower probability for correct interpretation as soon as possible. Therefore, the same prioritization requirements can apply to such systems as to test cases in software development.

A couple of publications have already appeared in this context. E.g., document US 2008/0 256 392 A1 describes techniques for prioritizing test dependencies. Thereby, a computer system employing such techniques may present a test structure for a set of test cases. The test structure may comprise prioritized test cases and dependencies between test cases. The dependencies may be based on predicted test case failures, due to failures of another test case. Also the document "Test Cases Prioritization using Open Dependency Structure Algorithm" from Indumathi, C. P. and Selvamani K., published in Procedia Computer Science 48 (2015), 250-255 and presented at the International Conference on Intelligent Computing, Communication & Convergence (ICCC-2014) describes test case prioritization as a key ingredient to detect errors and improve an error detection rate at an early stage for a relationships between dependent components.

In general, experience shows that generating a simple tree with all the possible sequences for test cases is highly inefficient. Also a simple use of an error propagation probability has only limited advantages because it only works fine if all the tests runs would need approximately the same time. However, if the execution times of components in the test chain diverges, more advanced metrics for a test case prioritization may be required.

Therefore, there is a need in the industry to propose a method for prioritizing, e.g., test cases based on error propagation probability per time unit and dependencies.

SUMMARY OF THE INVENTION

According to one aspect of the present invention, a computer-implemented method for dependent task prioritization may be provided. The method may comprise providing base data comprising task identifiers, wherein each task identifier is indicative of a respective task, failure values, wherein each failure value is indicative of a failure rate per time unit of a respective task, and dependency data values wherein each dependency data value is associated with a pair of tasks. The method may also comprise generating, from the base data, a probabilistic model where the tasks and related dependency data values are associated with a directed acyclic graph, and where each task is associated with a network node of the directed acyclic graph, and where each dependency data value is associated with a network edge of the directed acyclic graph, wherein each dependency data value is indicative of a conditional probability in relation to the respective failure rate per time unit.

Furthermore, the method may comprise determining for each task in the acyclic directed graph a posterior marginal probability value indicative of a probability of failure of the task and selecting, based upon the posterior marginal probability values, a sequence of tasks that is likely to fail fastest.

According to another aspect of the present invention, a dependent task prioritization for a prioritization of dependent tasks may be provided. The system may comprise one or more processors and a memory operatively coupled to the one or more processors, wherein the memory stores program code portions which, when executed by the one or more processors, enable the one or more processors to provide base data comprising task identifiers, wherein each task identifier is indicative of a respective task, failure values, wherein each failure value is indicative of a failure rate per time unit of a respective task, and dependency data values, wherein each dependency data value is associated with a pair of tasks.

The one or more processors may also be enabled to generate, from the base data, a probabilistic model, wherein the tasks and related dependency data values are associated with a directed acyclic graph, where each task is associated with a network node of the directed acyclic graph, where each dependency data value is associated with a network edge of the directed acyclic graph, where each dependency data value is indicative of a conditional probability in relation to the respective failure rate per time unit.

Moreover, the processor may also be enabled to determine for each task in the acyclic directed graph a posterior marginal probability value indicative of a probability of failure of the task; and to select, based upon the posterior marginal probability values, a sequence of tasks that is likely to fail fastest.

Furthermore, embodiments may take the form of a related computer program product, accessible from a computer-usable or computer-readable medium providing program code for use by or in connection with a computer or any instruction execution system by or in connection with a computer or any instruction execution system. For the purpose of this description, a computer-usable or computer-readable medium may be any apparatus that may contain means for storing, communicating, propagating or transporting the program for use by or in connection, with the instruction execution system, apparatus, or device.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered to be disclosed within this document.

The aspects defined above and further aspects of the present invention are apparent from the examples of embodiments to be described hereinafter and are explained with reference to the examples of embodiments to which the invention is not limited.

Figure 1:
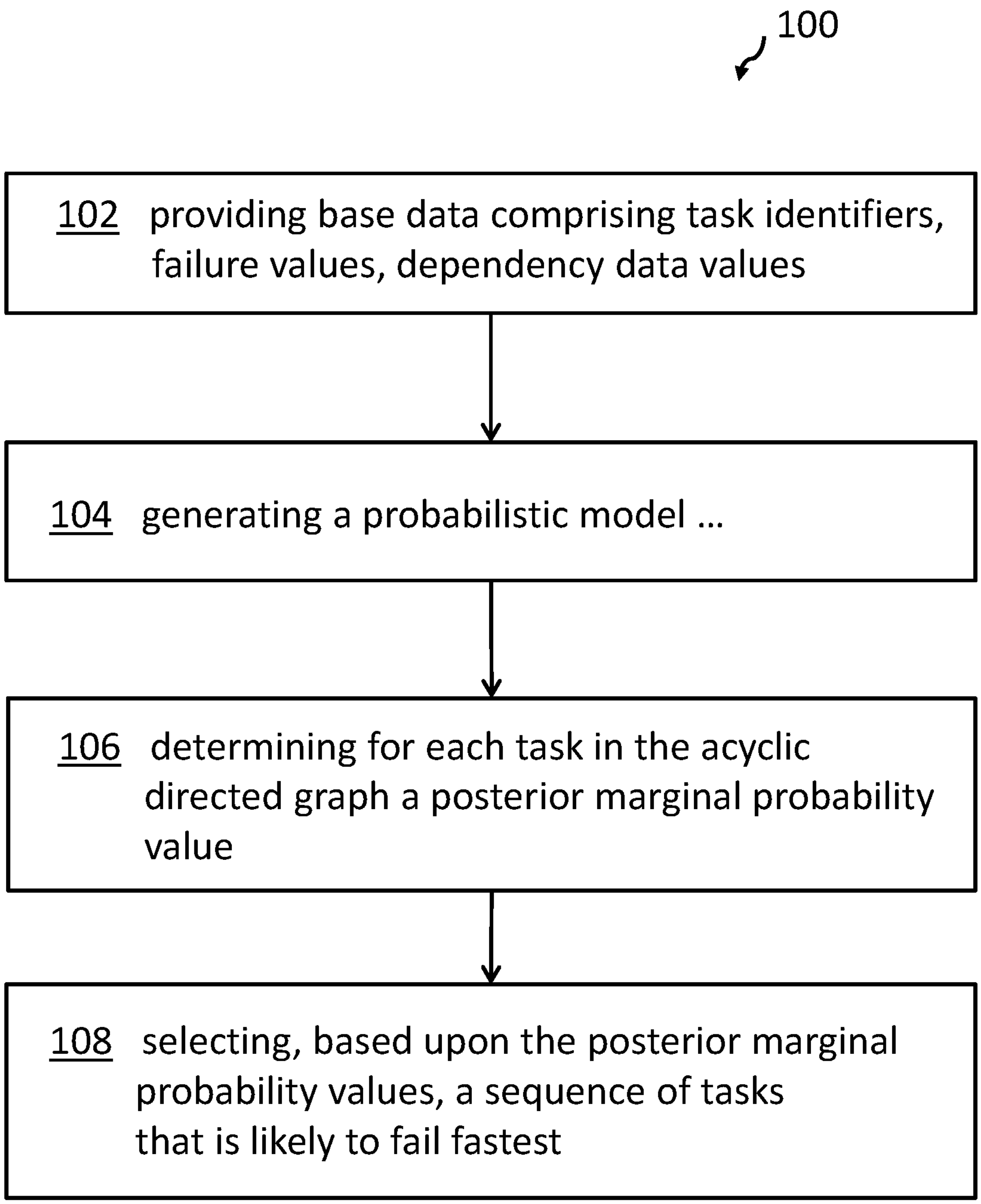

Preferred embodiments of the inventive concept are described, by way of example only, and with reference to the following drawings to which the inventive concept—for which variations and at least partial substitutions exist—is not limited:

FIG. 1 shows a block diagram of an embodiment of the inventive computer-implemented method for a prioritization of dependent tasks.

Figure 2:
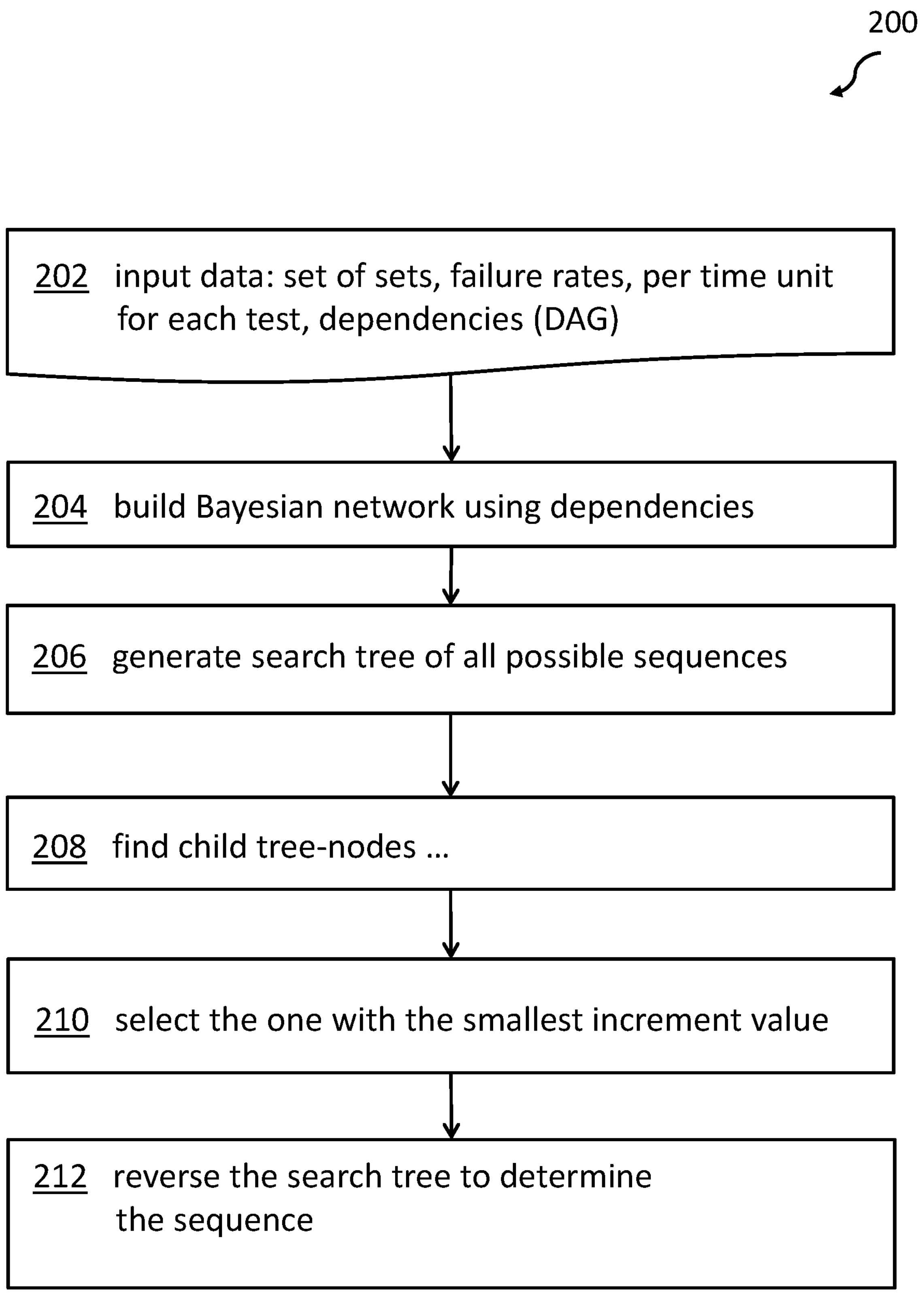

FIG. 2 shows a block diagram of a more implementation-near embodiment of the inventive concept described in the context of FIG. 1.

Figure 3:
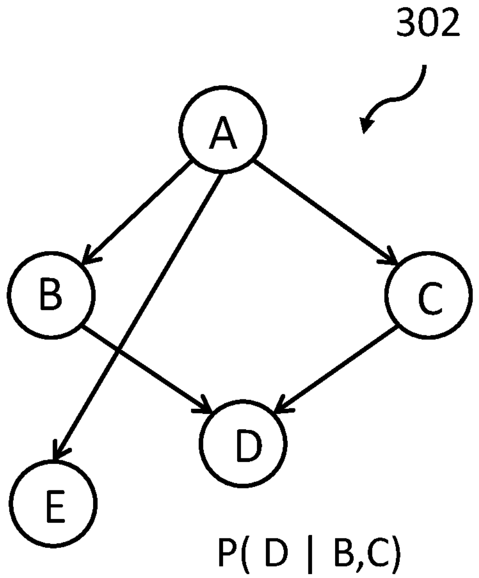

FIG. 3 shows a diagram of a basic dependency example and a related success/failure table.

FIG. 4 shows again the diagram of the basic dependency example along with a related Bayesian network graph.

Figure 4:
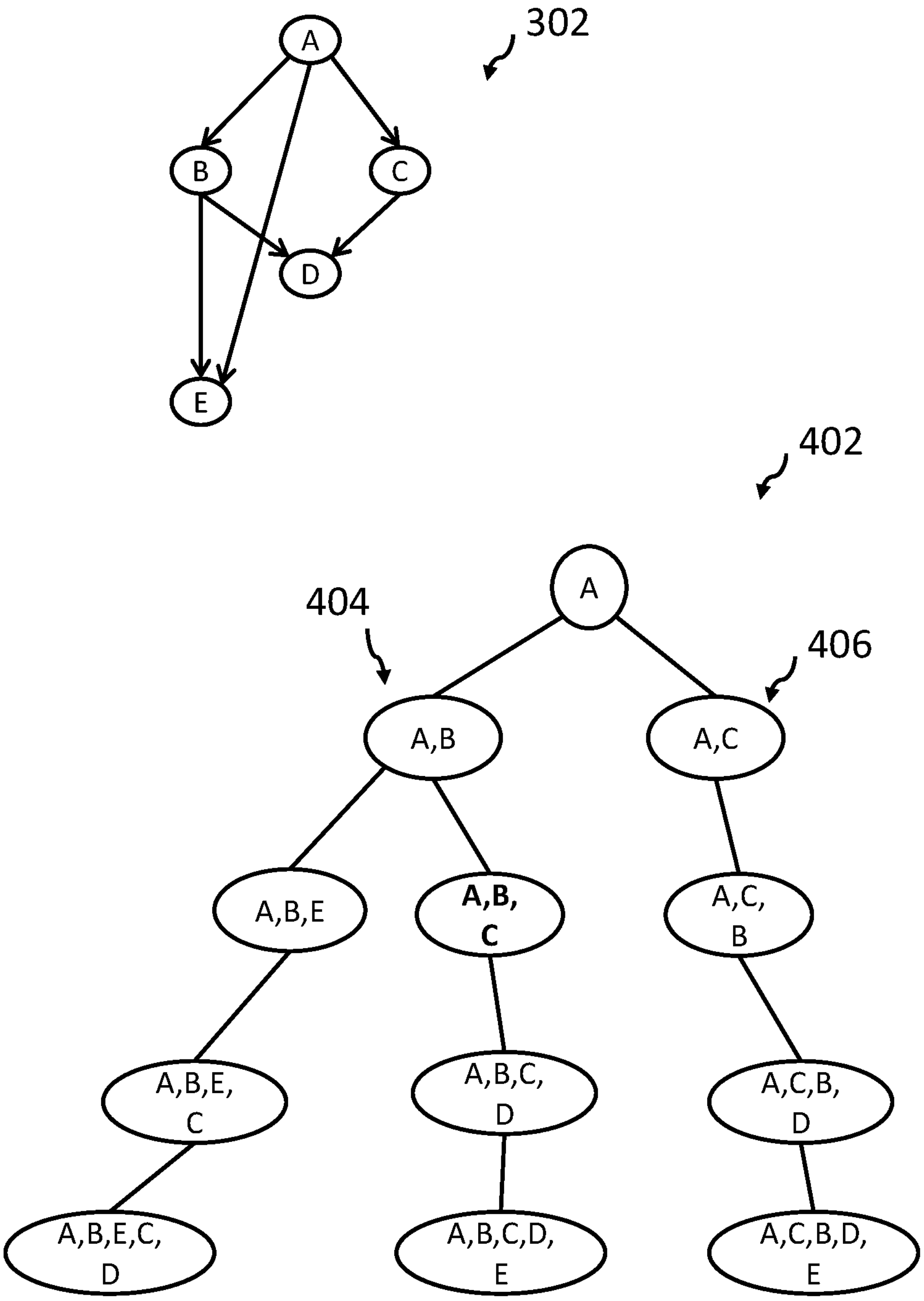
Figure 5:
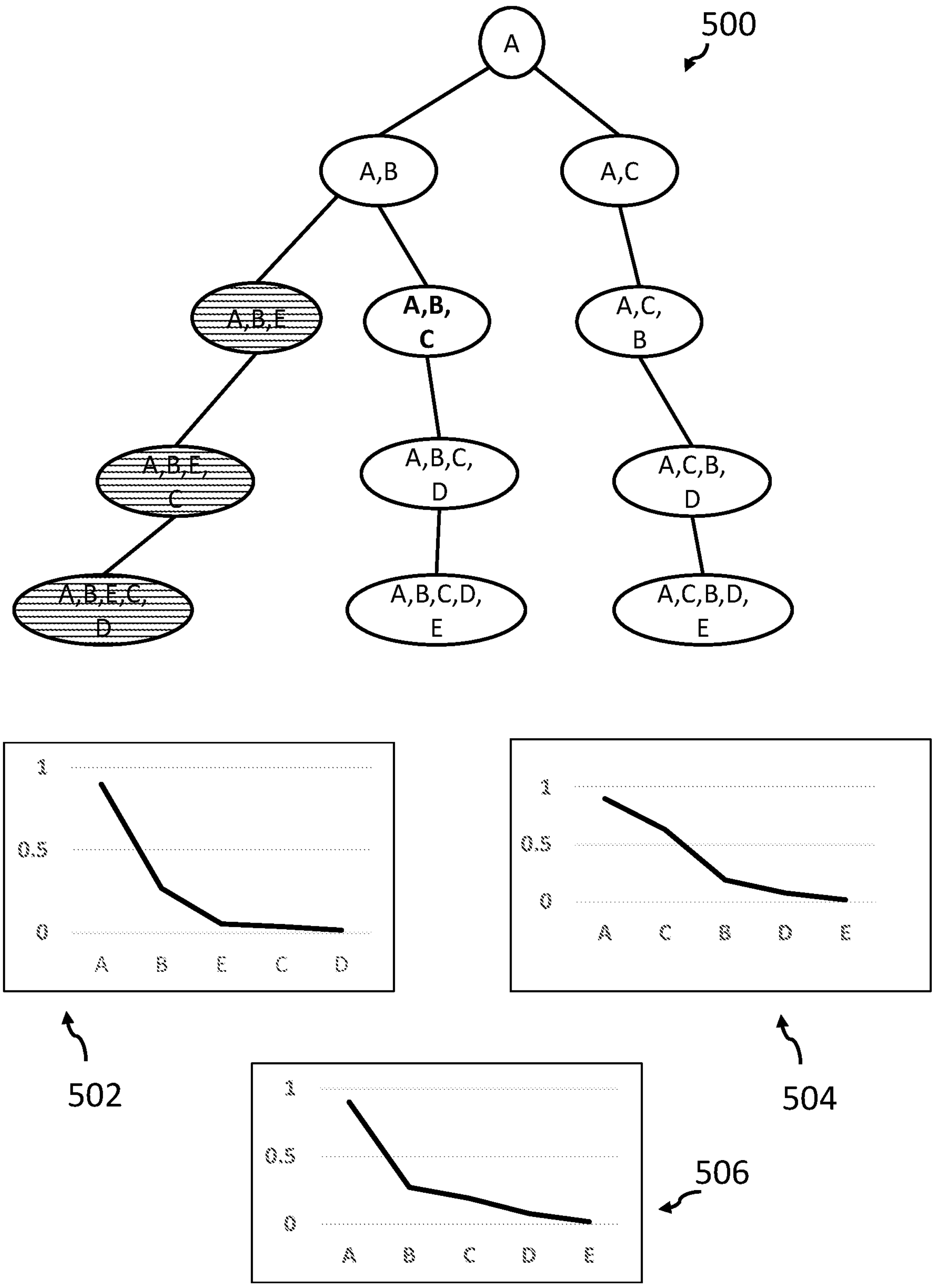

FIG. 5 shows a diagram of the Bayesian network graph of FIG. 4 along with three potential results.

Figure 6:
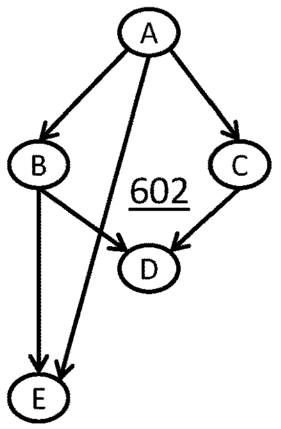
Figure 6:
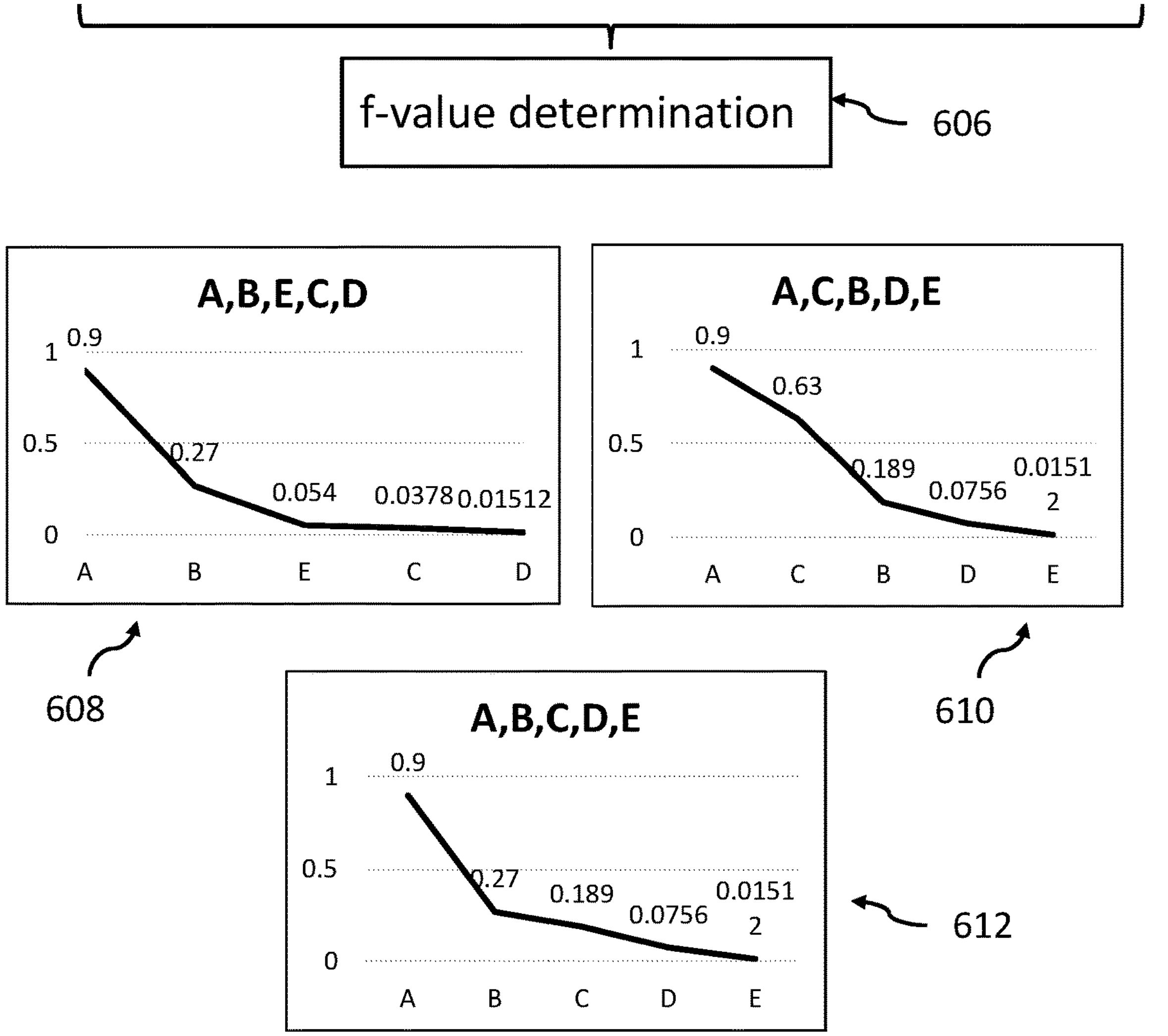

FIG. 6 shows diagrams of an embodiment for a greedy approach of the inventive concept with results.

Figure 7:
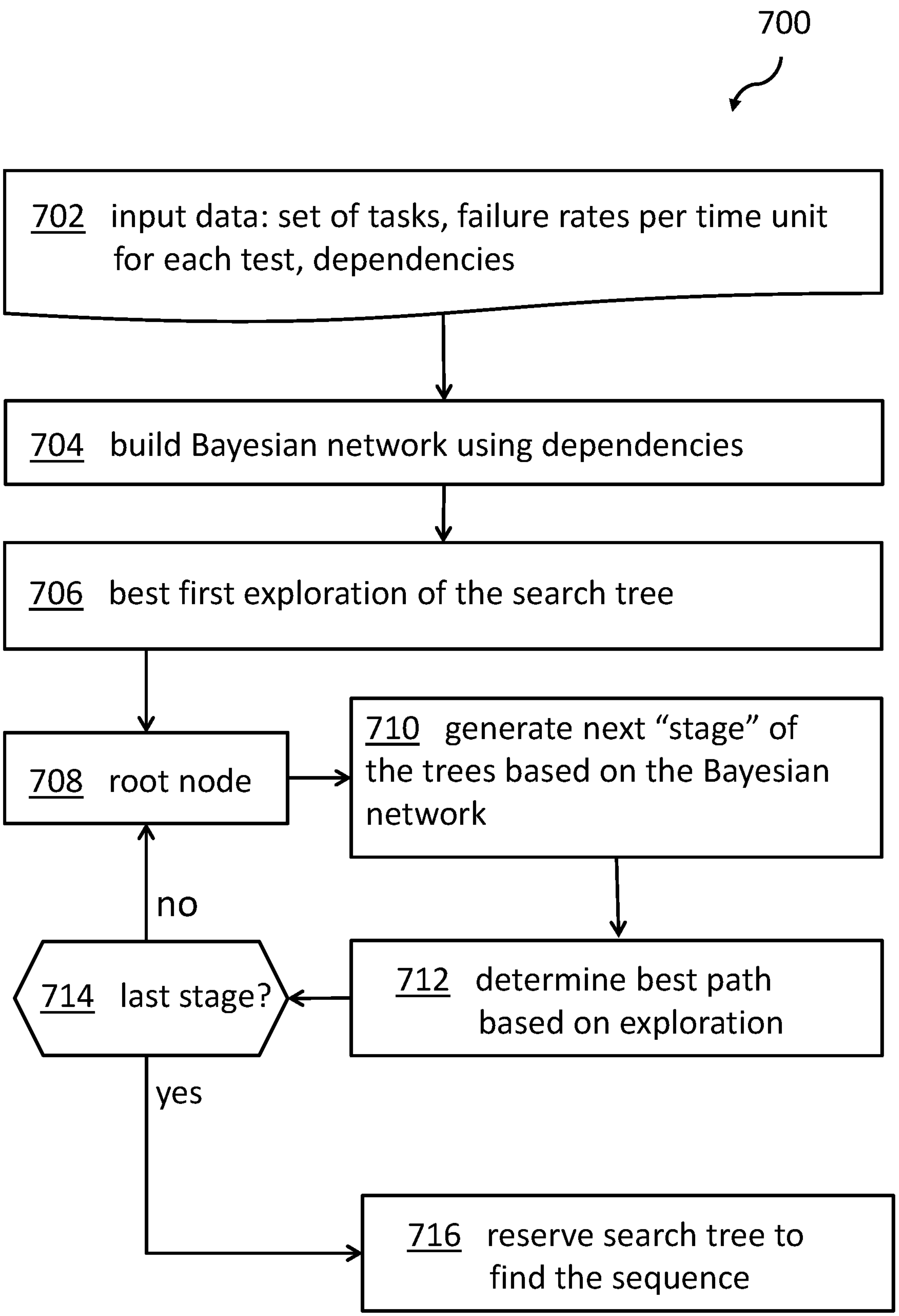

FIG. 7 shows a block diagram of a flowchart for a best first exploration (BFS) embodiment of the inventive concept.

Figure 8:
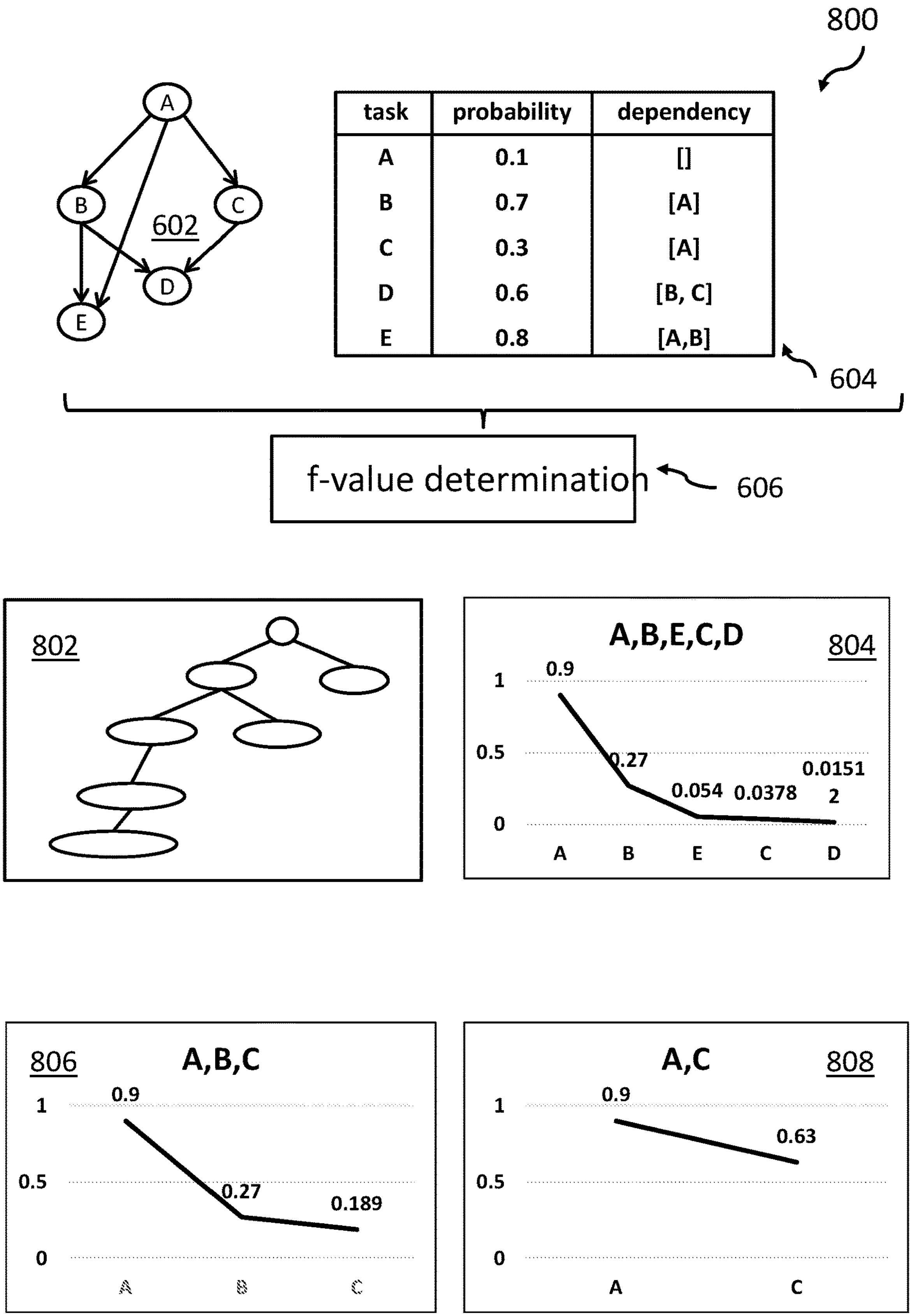

FIG. 8 shows diagrams of the BFS embodiment with results.

Figure 9:
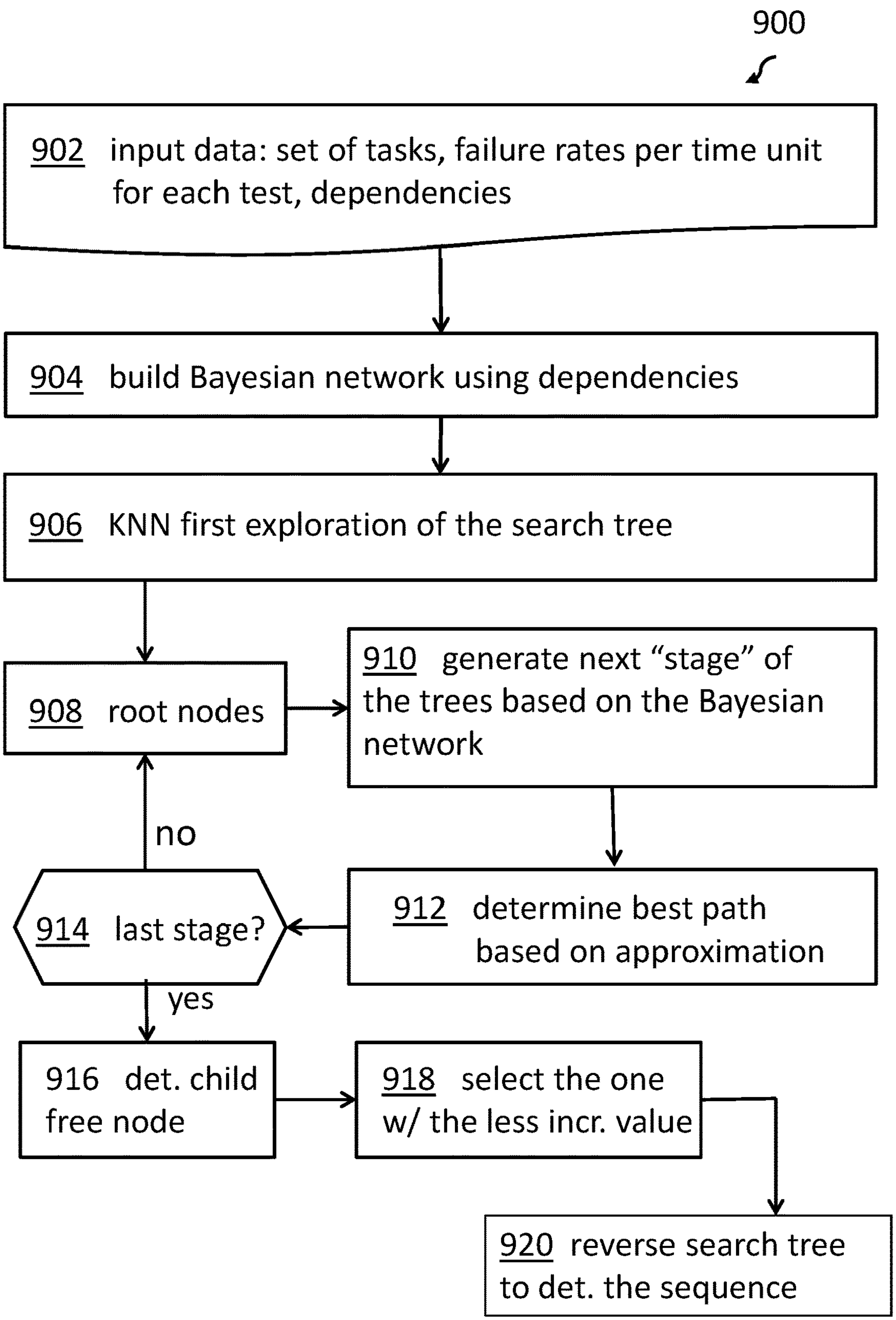

FIG. 9 shows a block diagram of a flowchart for a KNN embodiment of the inventive concept.

Figure 10:
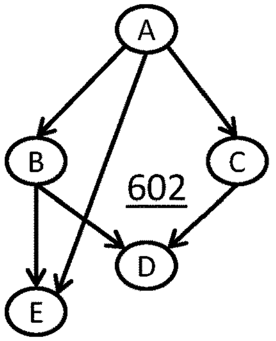
Figure 10:
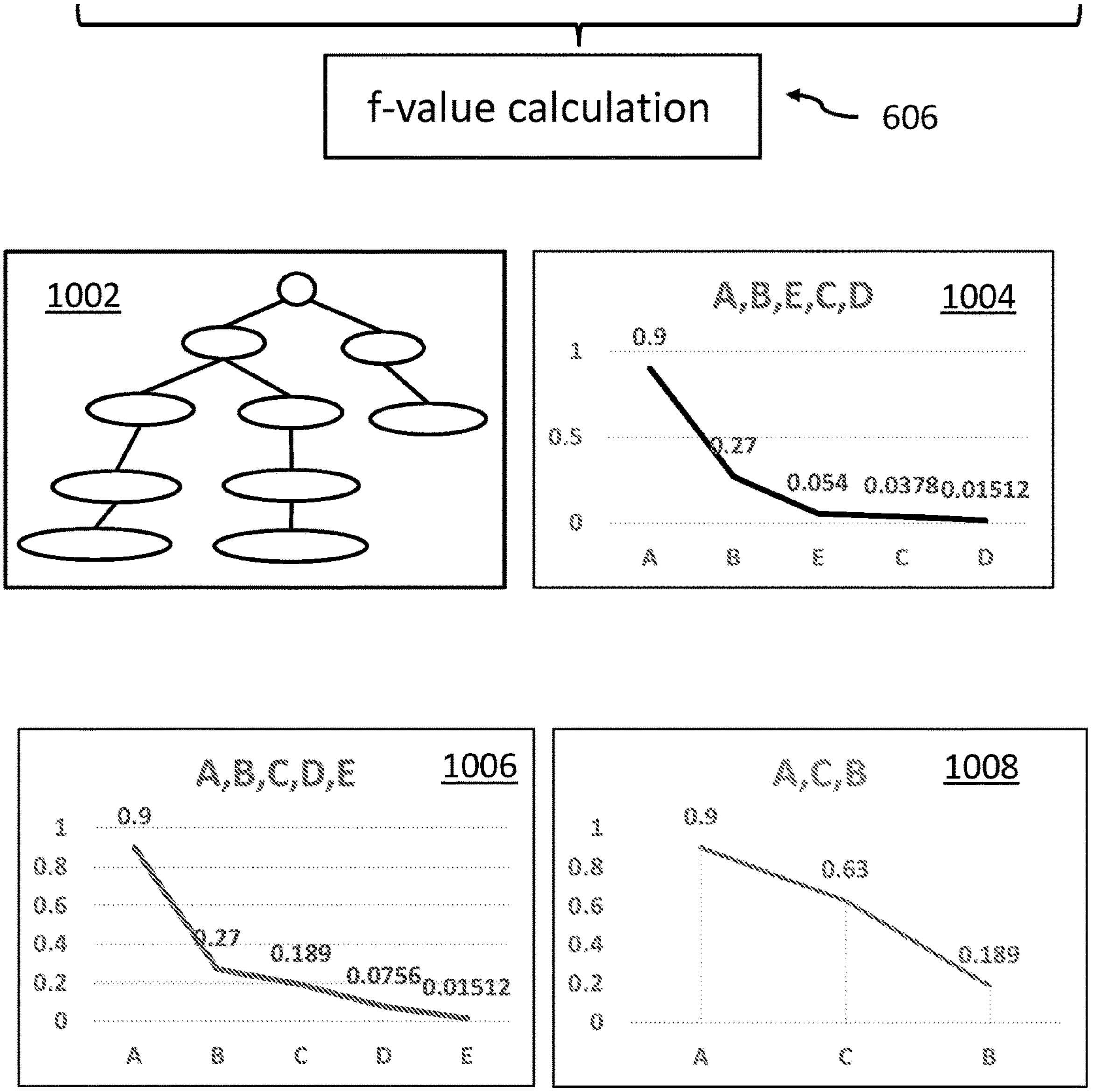

FIG. 10 shows diagrams of the KNN embodiment with results.

Figure 11:
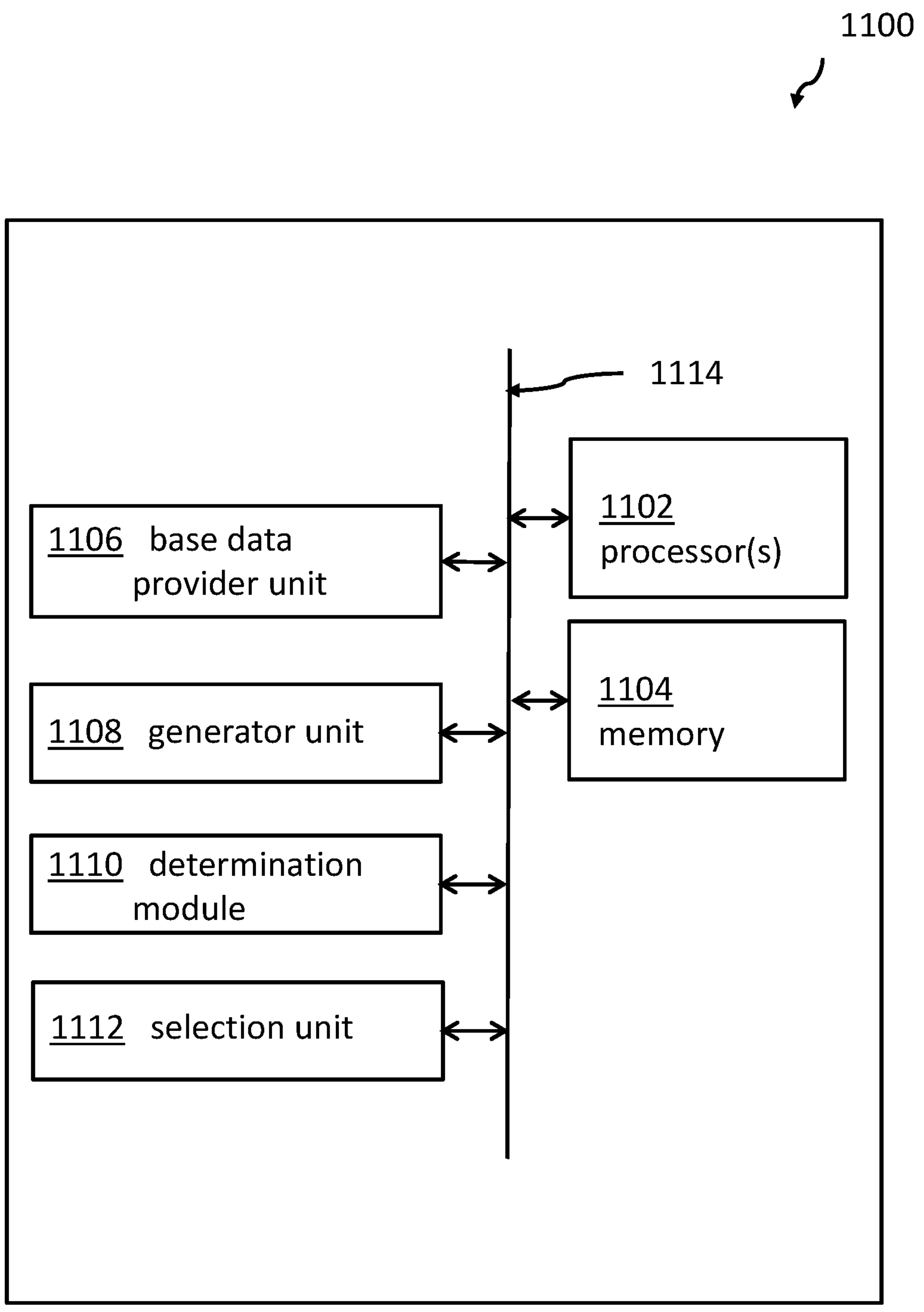

FIG. 11 shows a block diagram of an embodiment of the inventive dependent task prioritization system for a prioritization of dependent tasks.

Figure 12:
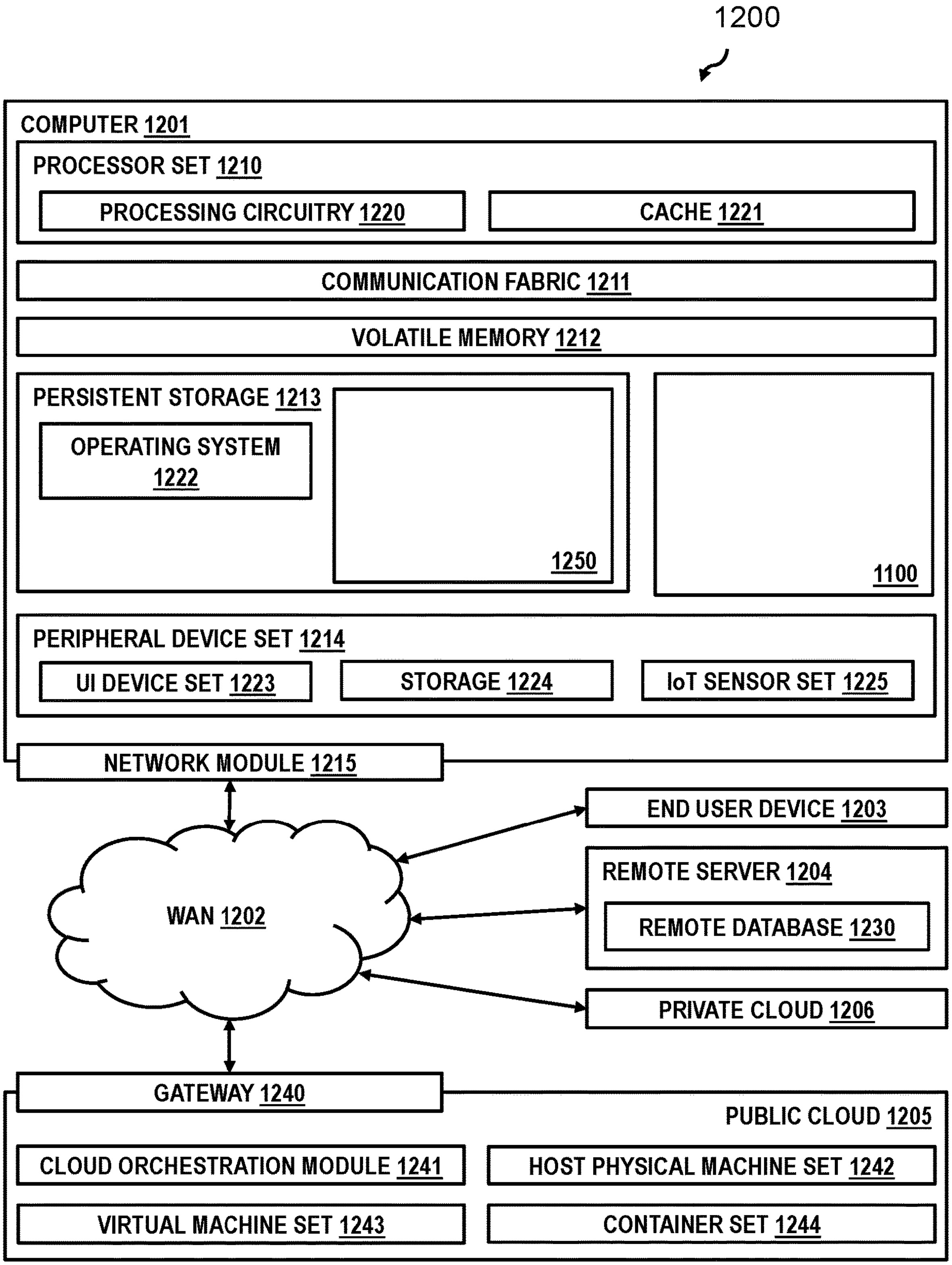

FIG. 12 shows an embodiment of a computing system comprising the system according to FIG. 11.

DETAILED DESCRIPTION

Embodiments of the inventive concept can be described as follows:

According to one embodiment of the present invention, a computer-implemented method for dependent task prioritization may be provided. The method may comprise providing base data comprising task identifiers, wherein each task identifier is indicative of a respective task, failure values, wherein each failure value is indicative of a failure rate per time unit of a respective task, and dependency data values wherein each dependency data value is associated with a pair of tasks. The method may also comprise generating, from the base data, a probabilistic model where the tasks and related dependency data values are associated with a directed acyclic graph, and where each task is associated with a network node of the directed acyclic graph, and where each dependency data value is associated with a network edge of the directed acyclic graph, wherein each dependency data value is indicative of a conditional probability in relation to the respective failure rate per time unit.

Furthermore, the method may comprise determining for each task in the acyclic directed graph a posterior marginal probability value indicative of a probability of failure of the task and selecting, based upon the posterior marginal probability values, a sequence of tasks that is likely to fail fastest.

According to another and related embodiment, a dependent task prioritization for a prioritization of dependent tasks may be provided. The system may comprise one or more processors and a memory operatively coupled to the one or more processors, wherein the memory stores program code portions which, when executed by the one or more processors, enable the one or more processors to provide base data comprising task identifiers, wherein each task identifier is indicative of a respective task, failure values, wherein each failure value is indicative of a failure rate per time unit of a respective task, and dependency data values, wherein each dependency data value is associated with a pair of tasks.

The one or more processors may also be enabled to generate, from the base data, a probabilistic model, wherein the tasks and related dependency data values are associated with a directed acyclic graph, where each task is associated with a network node of the directed acyclic graph, where each dependency data value is associated with a network edge of the directed acyclic graph, where each dependency data value is indicative of a conditional probability in relation to the respective failure rate per time unit.

Moreover, the processor may also be enabled to determine for each task in the acyclic directed graph a posterior marginal probability value indicative of a probability of failure of the task; and to select, based upon the posterior marginal probability values, a sequence of tasks that is likely to fail fastest.

The proposed computer-implemented method for time-series forecasting for time-series data with a periodic behavior larger than a respective sampling rate may offer multiple advantages, technical effects, contributions and/or improvements:

First, the concept proposed here may overcome the limitations of existing test case prioritization since a more dynamic and flexible approach may be adopted that does not require that the execution times of all tests to be performed may require approximately the same amount of time. Hence, a much better balance between require time and budget/computing resources to run specifics test cases may be reached. This is based on identifying first—or at least early on—the cases that have the highest probability of failure compared to all other permutations of the dependent components.

The three proposed implementation options—a “greedy” approach, the approach based on Breath-First-Search (BFS), and the approach of K-nearest neighbors—may allow a selection between speed and required computing resources. This may allow test case managers to choose different implementation options depending on the type of software development project—or other application areas. For a development of highly secure control systems for potentially hazardous materials, simpler IoT (Internet-of-things) system, commercial software applications, and operating systems or middleware components with different tolerance levels may be acceptable.

However, there are also additional benefits such as: saving resources in the case of regression testing by increasing the probability of early failure. The inventive concept may also reduce risks and projects by enabling real-world testing of the highest risk tasks as quickly as possible, and the inventive concept may also reduce development time due to shorter developer feedback loops. All of this is based on efficient sequence discovery for performing tests or discovering sequences of other dependencies based on a specific target function for example using a Bayesian network representation of the input tests and the associated prior failure rates per time unit. Since the scope of the inventive concept is relatively broad, it may be advantageously implemented and in several different domains such as regression testing and software development, e.g. for highly complex mainframe-, Power systems-, quantum-firmware developments, project planning and management as well as the scheduling of operating system development projects. Applications in, e.g., the fields of autonomous driving, NLP, starting large software systems, like operating systems and large enterprise or real-time control applications may also benefit from the inventive concept because conflicts between competing modules for parallel execution on hardware resources may be successfully avoided.

In the following, additional embodiments of the inventive concept-applicable for the method as well as for the system-will be described.

According to an advantageous embodiment of the method, selecting the sequence of the set of tasks that is likely to fail fastest may comprise selecting the sequence of the set of tasks with the highest sum of incremental failure probabilities—e.g., expressed as F(X), see below—between neighboring tasks. Thereby, neighboring tasks may represent those that have the same level in the tree of dependencies. For implementation purposes it may be better to use a value of 1−F(X), where X represents a sequence of tasks (e.g., ABE, where A, B, E represent tasks and nodes in the tree at the same time). In this case, "the sequence of the set of tasks with the highest sum of their incremented failure probabilities between neighboring tasks" may be implemented by choosing the lowest value of 1−F(X) in order to avoid overflows. This is because in larger trees many probability values are very close to "1". By summing up the incremental failure probabilities and rounding errors one may accidently "overrun 1"—most of the time. When using 1−F(X), this is much less likely.

According to a pretty useful embodiment of the method, the tasks may be test tasks for a system under test. This may also present a pretty good use case scenario. Thereby, the tasks may be any combination of developed software components, installed hardware components, set up tasks of network infrastructure components as well as tasks relating to configuring cloud computing services.

According to a further interesting embodiment of the method, the tasks may be project tasks, and the failure rate per time unit may be a risk value of a respective project task. The overall goal/objective may be to minimize the overall risk of the project, e.g., overrun the set deadline or endangering the entire project. Thereby, as risk value, a normalized risk value may be used in order to achieve comparability.

According to an alternatively advantageous embodiment of the method, the task may be a service of a boot process of an operating system comprising a plurality of services, and the failure rate per time unit may represent a probability for a failure to complete the service. In one scenario, this could happen because another "earlier" process did not end yet. The plurality of services may also be a large enterprise application, like, e.g., an ERP (enterprise resource planning), CRM (customer relationship management) or SCM/logistics (supply chain management) system having a lot of internal dependencies, a complex database system, a patent management system and IoT (Internet of Things) system using measured data to control actuators, or any other complex (software or computing) system.

According to an advantageous embodiment of the method, the acyclic directed graph may be a Bayesian network graph. This type of network graph has proven to be easier to use, comprehend, implement and use as a basis for the searched trees.

Hence, and according to a further permissive embodiment, the method may also comprise building a search tree based on the acyclic directed graph, i.e., the Bayesian network graph. Implementation-wise, this may represent an elegant solution.

According to an enhanced embodiment, the method may also comprise filtering branches of the directed acyclic graph using the Breadth-First-Search (BFS) technique. This may not represent the most complete and completely optimized approach, but the BFS approach may represent a good compromise between speed, required computing resources and results.

Alternatively and according to another enhanced embodiment of the method, the building the search tree may use a k-nearest-neighbor (KNN) technique. Here, the k-nearest neighbor algorithm may be used to prune the search tree and also achieve quicker results, thereby accepting a not 100% perfect optimization.

According to an advanced embodiment the method may also comprise creating for each node—and in particular also for its related parent node—of the acyclic directed graph—i.e., each task-a conditional probability table. This may be expressed as $P(x_i|pa_i)$ using failure rate per time unit values; this will be explained in more details in the context of a description of the figures.

In the context of this description, the following technical conventions, terms and/or expressions may be used:

The term 'dependent task prioritization' may denote here that tasks that are dependent from each other may be organized for execution according to priorities such that the sequence with the highest probability to fail is reached fastest. In doing so, it may be possible to reduce the total amount of time required to find out that a selected sequence of the tasks may not work. In software testing this means that a module with the potential errors can be identified as fast as possible.

The term 'base data' may denote historical data about tasks, identifiable by task identifiers, respective failure rates per time unit and respective dependencies, e.g., derived from a directed acyclic graph.

The term 'task' may denote any activity to be executed which may depend on another related task. This may be tests when testing large software systems, activities of a project, routines to be executed during the start of an operating system or a larger application system or database system, just to name a few.

The term 'failure rate per time unit' may denote historically experienced unsuccessful executions of respective tasks.

The term 'dependency data value' may denote whether an activity or task A may be dependent on another activity or task B. This may be expressed using the notation [A, B].

The term 'probabilistic model' may denote a decision model for an execution of (potentially) dependent activities or tasks based on historic values and related probability values, as well as a probability value to be determined for sequences of tasks to be executed.

The term 'directed acyclic graph' (DAG) may denote a known conceptual representation of a series of activities. Thereby, the order of the activities may be depicted by a graphical representation visually presenting a set of circles or ellipses (in general boxes), where each one may represent an activity (or a task, etc.), some of which may be connected by lines, which may represent the flow from one activity to another. Thereby, identifiers of the tasks may be symbolized inside the circles as ellipses.

The term 'network node' may denote a connection point within the directed acyclic graph. The nodes n may typically be denoted here by capital letters, like A, B, C, . . . or X, Y, Z.

The term 'network edge' may denote a connection between different nodes of a graph, e.g., the directed acyclic graph.

The term 'conditional probability' may denote a probability value for a failure of a certain task or task in a sequence of tasks, where the task itself is depend on failure probabilities (or success probabilities) of previous tasks in the sequence.

The term 'posterior marginal probability value' may denote the probability of failure of a downstream task given that we observed the state (i.e., either failure or success) of some other upstream tasks.

The term 'highest sum of incremental failure probabilities' or highest f-value F (n) may denote a value that is built from the sum of failure probability values in a sequence of tasks. In order to avoid overflows, it may be recommended to use a reversed f-value N (n)=1-F (n).

The term 'neighboring tasks' may denote tasks that share the same level and direct parent in the dependency tree.

In the following, a detailed description of the figures will be given. All instructions in the figures are schematic. Firstly, a block diagram of an embodiment of the inventive computer-implemented method for dependent task prioritization is given. Afterwards, further embodiments, as well as embodiments of the dependent task prioritization for a prioritization of dependent task will be described.

FIG. 1 shows a block diagram of a preferred embodiment of the computer-implemented method 100 for dependent task prioritization. The method 100 comprises providing, 102, base data comprising task identifiers, wherein each task identifier is indicative of a respective task, failure values, wherein each failure value is indicative of a failure rate per time unit of a respective task, and dependency data values. Hence, the base data deliver the basis for a prediction of dependencies, in particular a predicted sequence, i.e., "a look into the future" of which task is probably going to fail fastest. The base data are data from part, historic cases that have been collected over time. It builds the experience backbone of the inventive concept. It shall also be noted that in a minimal set of base data there may be only one record, or may also be a map where the tasks are represented by keys the and respective values represent dependencies which could also empty, i.e., NULL values, e.g. in case of only one pair. However, typical base data have a plurality of records comprising task identifiers, failure values and dependency data values. Thereby, each dependency data value is associated with a pair of tasks.

The method 100 comprises also generating, 104, from the base data, a probabilistic model, where the tasks and related dependency data values are associated with a directed acyclic graph—in particular, a Bayesian network—and where each task is associated with a network node of the directed acyclic graph. Furthermore, each dependency data value is associated with a network edge of the directed acyclic graph, wherein each dependency data value is indicative of a conditional probability in relation to the respective failure rate per time unit, i.e., of a sequence of involved tasks.

Moreover, the method 100 comprises determining, 106, for each task in the acyclic directed graph a posterior marginal probability value indicative of a probability of a failure of the task, and selecting, 108, based upon the posterior marginal probability values, a sequence of tasks—i.e., network nodes—that is likely to fail fastest.

FIG. 2 shows a first of a plurality of more implementation-near embodiments 200. The basic idea is to use a simple topological sort, i.e., a "greedy" approach. The process starts with providing, 202, input data comprising a set of tests, related (historic) failure rates per time unit for each of the tests, and dependencies, e.g., in the form of an dependency acyclic graph (DAG). Using these input data—in particular the dependencies—a Bayesian network is built, 204, on which basis then a search tree for all possible sequences of activities (e.g., tasks) is built, 206.

For this, for a determination of the nodes of the graph the following formulas are used:

$$F(n) = F(\text{parent}) + P(n) - F(\text{parent}) \times P(n);$$

$$N(n) = 1 - F(n);$$

$$\Delta N(X, Y, Z) = N(X) + N(N, Y) + N(X, Y, Z).$$

The process continues with finding, 208, child-tree nodes and selecting, 210, the one (tree-node) having the smallest sum of incremental values until a leaf tree node (i.e., a tree node without any child tree nodes) is reached. The leaf tree node corresponds to the sequence of tasks that most probably fails faster. Finally, the search tree sequence is reversed, 212, in order to determine the sequence of the tasks to be performed.

As a summary up to here, basically three steps exist: (i) providing input data, (ii) preparation, comprising the steps 204 and 206, and (iii) determining the sequence of tasks, i.e., the sequence of tasks having the highest probability to fail fastest.

In more detail, the Bayesian network is built in the following way: the input data comprises the set of tasks/tests/activities $x_1, \ldots, x_n$ and their failure rate values per time unit $r_1, \ldots, r_n$, and dependencies (DAG as $(x_i, x_j)$ meaning that $x_i$ must be executed before $x_j$. the output of this step is then the Bayesian network over network $x_1, \ldots, x_n$. Hence, the Bayesian network DAG G exists with variables $x_1, \ldots, x_n$. Using this as starting point, a directed edge $x_i \rightarrow x_j$ to G is added to G. Next, for each variable xi and related parents $pa_i$ in G, a conditional probability table (CPT) $P(x_i|pa_i)$ is built using the failure rates of the variables (compare FIG. 3).

FIG. 3 shows a graph 302 of five at least partially depending tasks A, B, C, D, E including their dependencies in form of the arrows between the nodes representing the tasks A, B, C, D, E. Additionally, FIG. 3 shows the conditional probability table 304. For the task/node "D" the probability for "D" is shown as being dependent on the tasks "B" and "C". Thereby, "S" stands for successful termination of the respective task and "F" stands for a failure of the respective task. For the first dependent line of the table, one can state P (D=f|B=f and C=f)=1; here "F" stands for failure, meaning that the probability for "D" to fail equals one because it is given that "B" as well as "C" fails. Similarly, the probability for "D" to be successful equals zero because it is given that "B" as well as "C" fails, and so on. Finally, the probability value for D to fail—compare the line before the last line—equals 0.04 ($r_D$). Consequently, the probability value for D to be successful—compare last line of CPT—equals 0.96, i.e., $1-r_D$.

Hence, one can say that the Bayesian network is used to compute posterior marginal probabilities of variables considering test/task dependencies and prior failure rates of the tasks. The posterior margin nodes $P(x_i)$ are determined (e.g., computed) using any probabilistic inference algorithm for Bayesian networks (e.g., VE, i.e. variable elimination, IBP, i.e., iterative belief propagation, or WMD, i.e. weighted mini-buckets). For more implementation details one may refer, e.g., to https://github.ibm.com/IBM-Research-AI/merlin. However, any probabilistic inference library can be used, e.g., also pgmpy (compare https://github.com/pgmpy/pgmpy), or merlin (compare https://github.com/radum2275/merlin).

In other words, and in more detail, the Bayesian network is built using as input, the set of tasks/tests $x_1, \ldots, x_n$, their respective failure rates per time unit $r_1, \ldots, r_n$, dependencies as $(x_i, x_j)$, meaning that $x_i$ must be executed before $x_j$. The output is then the Bayesian network over $x_1, \ldots, x_n$.

With this, the Bayesian network DAG G is created with variables $x_1, \ldots, x_n$. So, for each dependency $(x_i, x_j)$ a directed edge $x_i \rightarrow x_j$ is added to G.

Additionally, for each variable $x_i$ and parent $pa_i$ in G, the CPT is created as $P(x_i|pa_j)$ using the failure rates of the variables.

FIG. 4 shows again the diagram of the basic dependency example 302 with the nodes or tasks A, B, C, D, E determination module along with a related Bayesian network graph 402. This network graph illustrates all different sequences of an execution of the tasks which are dependent on each other according to the dependency graph 302. Please note that the tasks have the unique identifier values of A, B, C, D, E. I.e., task D can only be executed if task A as well as tasks B or C have been finished successfully. Hence, the second layer of execution options in the Bayesian tree is represented by the possibilities of executing tasks A and B or tasks a and C. These two options are represented by the ellipses 404 and 406. In the tree 402 these ellipses 404 and 406 may be denoted as "neighbors".

The structure of the dependencies 302 is the same as used before. Here, the following posterior marginals are assumed to be: P(A)=0.1; P(B)=0.7; P(C)=0.3; P(D)=0.6; P(E)=0.8. Thereby, a node n in the search tree represents a partial test sequence that satisfies the test precedents constraints, i.e., dependencies. Its respective f-value F (N) estimates the probability of failure. The f-values can be determined as:

$$F(n) = F\,(\text{parent}) + P(n) - F(\text{parent}) \times P(n). \qquad 1.$$

Consequently, the following f-values can be determined:

$$F(A) = P(A) = 0{,}1$$

$$F(A, B) = F(A) + P(B) - F(A) \ast P(B) = 0{,}1 + 0{,}7 - 0{,}1 \ast 0{,}7 = 0{,}73$$

$$F(A, C) = F(A) + P(C) - F(A) \ast P(C) = 0{,}1 + 0{,}3 - 0{,}1 \ast 0{,}7 = 0{,}37$$

$$F(A, B, E) = F(A, B) + P(E) - F(A, B) \ast P(E) = 00{,}73 + 0{,}8 - 0{,}73 \ast 0{,}8 = 0{,}946$$

$$F(A, B, C) = F(A, B) + P(C) - F(A, B)^{*}P(C) = 0{,}73 + 0{,}3 - 0{,}73^{*}0{,}3 = 0{,}811$$

$$F(A, C, B) = F(A, C) + P(B) - F(A, C)^{*}P(B) = 0{,}37 + 0{,}7 - 0{,}37^{*}0{,}7 = 0{,}811$$

$$F(A, B, E, C) = F(A, B, E) + P(C) - F(A, B, E)^{*}P(C) = 0{,}946 + 0{,}3 - 0{,}946^{*}0{,}3 = 0{,}9622$$

$$F(A, B, C, D) = F(A, B, C) + P(D) - F(A, B, C)^{*}P(D) = 0{,}811 + 0{,}6 - 0{,}811^{*}0{,}6 = 0{,}9244$$

$$F(A, C, B, D) = F(A, C, B) + P(D) - F(A, C, B)^{*}P(D) = 0{,}811 + 0{,}6 - 0{,}811^{*}0{,}6 = 0{,}9244$$

$$F(A, B, E, C, D) = F(A, B, E, C) + P(D) - F(A, B, E, C)^{*}P(D) = 0{,}9622 + 0{,}6 - 0{,}9622 \ast 0{,}6 = 0{,}98488$$

$$F(A, B, C, D, E) = F(A, B, C, D) + P(E) - F(A, B, C, D)^{*}P(E) = 0{,}9244 + 0{,}8 - 0{,}9244 \ast 0{,}8 = 0{,}98488$$

$$F(A, C, B, D, E) = F(A, C, B, D) + P(E) - F(A, C, B, D)^{*}P(E) = 0{,}9244 + 0{,}8 - 0{,}9244 \ast 0{,}8 = 0{,}98488$$

FIG. 5 shows a diagram of the Bayesian network graph of FIG. 4 along with three potential results. In this sense, FIG. 5 is a continuation of the context discussed using FIG. 4. The tree structure 500 shows that the nodes "ABE", "ABEC", "ABECD" are marked and striped. As a repetition of above, the example data are:

| Task | Probability | Dependencies |
|---|---|---|
| A | 0.1 | [ ] |
| B | 0.2 | [A] |
| C | 0.3 | [A] |
| D | 0.6 | [B, C] |
| E | 0.8 | [A, B] |

Based on the above values, namely, P(X), X=node identifier the following n-values can be determined, were N(n)=1−F(n).

So, this can be determined for three different options, namely "A, B, E, C, D" (compare 502), "A, B, C, D, E" (compare 504), "A, C, B, D, E" (compare 506), as shown in the lower part of FIG. 5.

For N(n)=1−F(n) and the given number, the following follows:

For "A, B, E, C, D", 502:

$$N(A)=1-0.1=0.9$$

$$N(A,B)=1-0.73=0{,}27$$

$$N(A,B,E)=1-0.946=0{,}054$$

$$N(A,B,E,C)=1-0.9622=0.0378$$

$$N(A,B,E,C,D)=1-0.98488=0.01512$$

For "A, B, C, D, E", 504:

$$N(A)=1-0.1=0.9$$

$$N(A,B)=1-0.73=0{,}27$$

$$N(A,BC)=1-0.811=0.189$$

$$N(A,B,C,D)=1-0.9244=0.0756$$

$$N(A,B,C,D,E)=1-0.98488=0.01512$$

And for "A, B, E, D, E", 506:

$$N(A)=1-0.1=0.9$$

$$N(A,C)=1-0.37=0.63$$

$$N(A,C,B)=1-0.811=0.189$$

$$N(A,C,B,D)=1-0.9244=0.0756$$

$$N(A,C,B,D,E)=1-0.98488=0.01512$$

As a consequence, the determination gives:

$$\Delta N(A,B,C,D,E)=N(A)+N(A,B)+N(A,B,C)+N(A,B,C,D,E) \text{ results in}$$

$$\Delta N(A,B,E,C,E)=N(A)+N(A,B)+N(A,B,E)+N(A,B,E,C)+N(A,B,E,C,D)=0{,}9+0{,}27+0{,}054+0{,}0378+0{,}01512=1.27692$$

$$\Delta N(A,B,C,D,E)=N(A)+N(A,B)+N(A,B,C)+N(A,B,C,D)+N(A,B,C,D,E)=0{,}9+0{,}27+0{,}189+0{,}0756+0{,}01512=1.44972$$

$$\Delta N(A,C,B,D,E)=N(A)+N(A,C)+N(A,C,B)+N(A,C,B,D)+N(A,C,B,D,E)=0{,}9+0{,}637+0{,}189+0{,}0756+0{,}01512=1.80972$$

Finally, the sequence with a minimum ΔN (here, 1.27692) is the solution; hence, the sequence "A, B, E" is likely to fail fastest in this greedy approach.

FIG. 6 shows diagrams 600 of an embodiment for a greedy approach of the inventive concept with results and summarizes the details of the description of FIG. 5. The starting point is again the dependency graph 602 which is equivalent to the dependency graphs used before. The same applies to the values in the table 604. Based on this, the f-value determination is done, 606. As a result, the three sequence graphs 608, 610, 612 can be generated representing the different sequences of tasks performed, showing again that the sequence "ABE" has a highest probability to fail fastest. It should be noted that the following correspondences exist between the reference numerals 502/608, 504/610, 506/612. Thereby, the graphs 608, 610, 612 include the numbers of the included n-values into the graphs.

FIG. 7 shows a block diagram of a flowchart 700 for a best first exploration (BFS) embodiment of the inventive concept. This represents a different embodiment compared to the previous and is also a possible solution of the generally presented inventive concept.

The input data 702 are the same as in the embodiment discussed in the context of FIG. 2, namely, the set of tasks, the failure rates per second (or any other time unit) for each task or task and respective dependencies. Also here, the Bayesian network is built using the dependencies, 704. From here on, the sequence is different than the one of FIG. 2.

In step 706, a best first exploration of the search tree is examined. For this, respective node values are assigned according to the already used formulas $$F(n)=F\,(\text{parent})+P(n)-F(\text{parent})\times P(n)$$

$$N(n)=1-F(n)$$

$$\Delta N\,(X,Y,Z)=N(X)+N(X,Y)+N(X,Y,Z), \text{ for any nodes } X, Y, Z.$$

Based on this, a root node is determined, 708 and the next "stage" of the tree based on the Bayesian network is generated, 710. Then, the best path based on an exploration is determined, 712. Next, it is determined, 714, whether this is the last stage. If that is not the case—"no"—the process returns to determining the respective root node, 708. If the last stage is reached—"yes" in determination 714—the sequence of search tree is reversed, 716, to find the sequence of tasks or tests with the highest probability to fail fastest.

FIG. 8 shows diagrams 800 of the BFS embodiment with results. The starting points of the dependency graph 602 and the table 604 as well as the f-value calculation remains identical to what has been explained before. However, the Bayesian network graph/tree is now shown in a shortened version 802 reflecting the shortcutting approach of the BFS algorithm. Those partial trees of the original tree of, e.g., FIG. 4, FIG. 5 that are not further examined are not shown right away.

Also in this embodiment, the sequence with the lowest number of the increments between the nodes is the correct solution, namely "A, B, E, C, D", 804: (0.9+0.26+0.054+0.0378+0.01512). This remains also true in light of the diagrams 806 and 808.

FIG. 9 shows a block diagram of a flowchart 900 for a KNN embodiment of the inventive concept is a third alternative solution of the inventive concept. Identical to the greedy approach and the BFS approach are the process steps of accessing the input data 902, namely, the set of tasks, the failure rates per time unit for, e.g., each test (or task or activity) and related dependencies as well as building 904 the Bayesian network using the dependencies.

Next, a K-nearest-neighbor exploration 906 of the search tree is executed. Also here, the approach discussed above already $$F(n)=F\text{ (parent)}+P(n)-F\text{(parent)}\times P(n)$$

$$N(n)=1-F(n)$$

$$\Delta N\,(X,\,Y,\,Z)=N(X)+N(X,\,Y)+N(X,\,Y,\,Z),\text{ for any nodes }X,\,Y,\,Z.$$

is also used.

As a next activity in the process the identification 908 of the respective root nodes is performed followed by the step of generating, 910, a next "stage" of the (sub-) trees based on the Bayesian network. From here, the process continues with determining, 912, a best path based on the respective approximation. This is followed by a determination 914 whether the last stage is reached. If that's not the case—"no"—the process circuits back to that determination of the root nodes, 908. In case the last stage is reached—"yes of the determination 914—a determination 916 of the child free node follows as well as a selection 918 the one sequence with the smallest sum of the incremental values. The process then ends with reversing, 920, the search tree to determine the sequence of the tests/tasks/activities to be selected a determination.

FIG. 10 shows diagrams 1000 of the KNN embodiment with the results. The prerequisites of the dependency graph 602, the table 604 and the f-value calculation/determination are identical to the ones of the before and discussed embodiments. However, the resulting/remaining Bayesian network 1002 has now a different form derived from the Bayesian network according to FIG. 4, 402. The Bayesian network 1002 does not have the node numbers inside but in orientation in respect to the graphical representation as possible. It turns out that the right branch is shorter than in FIG. 4.

Additionally, FIG. 10 shows additional graphs for the sequences "A, B, E, C, D" 1004, "A, B, C, D, E" 1006 as well as "A, C, B" 1008. As discussed above, the sequence having the lowest sum of incremental values from node to node is selected as the optimal sequence with the highest probability to fail fastest, in this case also the sequence "A, B, E, C, D" 1004 with the sum of the incremental values being again (0.9+0.27+0.054+0.0378+0.01512).

FIG. 11 shows a block diagram of an embodiment of the dependent task prioritization system 1100 for a prioritization of dependent task. The system 1100 comprises one or more processors 1102 and a memory 1104 operatively coupled to the one or more processors 1102, where the memory 1104 stores program code portions which, when executed by the one or more processors 1102, enable the one or more processors 1102 to provide base data comprising task identifiers, wherein each task identifier is indicative of a respective task, failure values, wherein each failure value is indicative of a failure rate per time unit of a respective task, and dependency data values, wherein each dependency data value is associated with a pair of tasks. This may be performed by base data provider unit 1106.

The one or more processors 1104 are further enabled to generate, from the base data, a probabilistic model, where the tasks and related dependency data values are associated with a directed acyclic graph, and where each task is associated with a network node of the directed acyclic graph. Additionally, each dependency data value is associated with a network edge of the directed acyclic graph, where each dependency data value is indicative of a conditional probability in relation to the respective failure rate per time unit. This task can be performed by a generator unit 1108.

Furthermore, the one or more processors 1102 are enabled to determine—in particular, by a determination module 1110—for each task in the acyclic directed graph a posterior marginal probability value indicative of a probability of failure of the task, and to select—in particular, by a selection unit 1112—based upon the posterior marginal probability values, a sequence of tasks that is likely to fail fastest.

It shall also be mentioned that all functional units, modules and functional blocks may be communicatively coupled to each other for signal or message exchange in a selected 1:1 manner. Alternatively the functional units, modules and functional blocks can be linked to a system internal bus system 1114 for a selective signal or message exchange. As functional units, modules and functional blocks at least the following are considered: the one or more processors 1102, the memory 1104, the base data provider unit 1106, the generator unit 1108, the determination module 1110, and the selection unit 1112.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment (CPP embodiment or CPP) is a term used in the present disclosure to describe any set of one, or more, storage media (also called mediums) collectively included in a set of one, or more, storage devices that collectively include machine readable code corresponding to instructions and/or data for performing computer operations specified in a given CPP claim. A storage device is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 12 shows a computing environment 1200 comprising an example of an environment for the execution of at least some of the computer code involved in performing the inventive methods, such as the code block 1250, implementing the computer-implemented method 100 (compare, FIG. 1) for dependent task prioritization.

In addition to block 1250, computing environment 1200 includes, for example, computer 1201, wide area network (WAN) 1202, end user device (EUD) 1203, remote server 1204, public cloud 1205, and private cloud 1206. In this embodiment, computer 1201 includes processor set 1210 (including processing circuitry 1220 and cache 1221), communication fabric 1211, volatile memory 1212, persistent storage 1213 (including operating system 1222 and block 1250, as identified above), peripheral device set 1214 (including user interface (UI), device set 1223, storage 1224, and Internet of Things (IoT) sensor set 1225), and network module 1215. Remote server 1204 includes remote database 1230. Public cloud 1205 includes gateway 1240, cloud orchestration module 1241, host physical machine set 1242, virtual machine set 1243, and container set 1244.

COMPUTER 1201 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1230. As is well understood in the art of computer technology, and depending upon the technology, performance of a computer-implemented method may be distributed among multiple computers and/or between multiple locations. On the other hand, in this presentation of computing environment 1200, detailed discussion is focused on a single computer, specifically computer 1201, to keep the presentation as simple as possible. Computer 1201 may be located in a cloud, even though it is not shown in a cloud in FIG. 12. On the other hand, computer 1201 is not required to be in a cloud except to any extent as may be affirmatively indicated.

PROCESSOR SET 1210 includes one, or more, computer processors of any type now known or to be developed in the future. Processing circuitry 1220 may be distributed over multiple packages, for example, multiple, coordinated integrated circuit chips. Processing circuitry 1220 may implement multiple processor threads and/or multiple processor cores. Cache 1221 is memory that is located in the processor chip package(s) and is typically used for data or code that should be available for rapid access by the threads or cores running on processor set 1210. Cache memories are typically organized into multiple levels depending upon relative proximity to the processing circuitry. Alternatively, some, or all, of the cache for the processor set may be located "off chip." In some computing environments, processor set 1210 may be designed for working with qubits and performing quantum computing.

Computer readable program instructions are typically loaded onto computer 1201 to cause a series of operational steps to be performed by processor set 1210 of computer 1201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1221 and the other storage media discussed below. The program instructions, and associated data, are accessed by processor set 1210 to control and direct performance of the inventive methods. In computing environment 1200, at least some of the instructions for performing the inventive methods may be stored in block 1250 in persistent storage 1213.

COMMUNICATION FABRIC 1211 is the signal conduction paths that allow the various components of computer 1201 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1212 is any type of volatile memory now known or to be developed in the future. Examples include dynamic type random access memory (RAM) or static type RAM. Typically, the volatile memory is characterized by random access, but this is not required unless affirmatively indicated. In computer 1201, the volatile memory 1212 is located in a single package and is internal to computer 1201, but, alternatively or additionally, the volatile memory may be distributed over multiple packages and/or located externally with respect to computer 1201.

PERSISTENT STORAGE 1213 is any form of non-volatile storage for computers that is now known or to be developed in the future. The non-volatility of this storage means that the stored data is maintained regardless of whether power is being supplied to computer 1201 and/or directly to persistent storage 1213. Persistent storage 1213 may be a read only memory (ROM), but typically at least a portion of the persistent storage allows writing of data, deletion of data and re-writing of data. Some familiar forms of persistent storage include magnetic disks and solid state storage devices. Operating system 1222 may take several forms, such as various known proprietary operating systems or open source Portable Operating System Interface type operating systems that employ a kernel. The code included in block 1250 typically includes at least some of the computer code involved in performing the inventive methods.

PERIPHERAL DEVICE SET 1214 includes the set of peripheral devices of computer 1201. Data communication connections between the peripheral devices and the other components of computer 1201 may be implemented in various ways, such as Bluetooth connections, Near-Field Communication (NFC) connections, connections made by cables (such as universal serial bus (USB) type cables), insertion type connections (e.g., secure digital (SD) card), connections made though local area communication networks and even connections made through wide area networks such as the internet. In various embodiments, UI device set 1223 may include components such as a display screen, speaker, microphone, wearable devices (such as goggles and smart watches), keyboard, mouse, printer, touchpad, game controllers, and haptic devices. Storage 1224 is external storage, such as an external hard drive, or insertable storage, such as an SD card. Storage 1224 may be persistent and/or volatile. In some embodiments, storage 1224 may take the form of a quantum computing storage device for storing data in the form of qubits. In embodiments where computer 1201 is required to have a large amount of storage (for example, where computer 1201 locally stores and manages a large database) then this storage may be provided by peripheral storage devices designed for storing very large amounts of data, such as a storage area network (SAN) that is shared by multiple, geographically distributed computers. IoT sensor set 1225 is made up of sensors that can be used in Internet of Things applications. For example, one sensor may be a thermometer and another sensor may be a motion detector.

NETWORK MODULE 1215 is the collection of computer software, hardware, and firmware that allows computer 1201 to communicate with other computers through WAN 1202. Network module 1215 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1215 are performed on the same physical hardware device. In other embodiments (e.g., embodiments that utilize software—defined networking (SDN)), the control functions and the forwarding functions of network module 1215 are performed on physically separate devices, such that the control functions manage several different network hardware devices. Computer readable program instructions for performing the inventive methods can typically be downloaded to computer 1201 from an external computer or external storage device through a network adapter card or network interface included in network module 1215.

WAN 1202 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1203 is any computer system that is used and controlled by an end user (for example, a customer of an enterprise that operates computer 1201), and may take any of the forms discussed above in connection with computer 1201. EUD 1203 typically receives helpful and useful data from the operations of computer 1201. For example, in a hypothetical case where computer 1201 is designed to provide a recommendation to an end user, this recommendation would typically be communicated from network module 1215 of computer 1201 through WAN 1202 to EUD 1203. In this way, EUD 1203 can display, or otherwise present, the recommendation to an end user. In some embodiments, EUD 1203 may be a client device, such as thin client, heavy client, mainframe computer, desktop computer and so on.

REMOTE SERVER 1204 is any computer system that serves at least some data and/or functionality to computer 1201. Remote server 1204 may be controlled and used by the same entity that operates computer 1201. Remote server 1204 represents the machine(s) that collect and store helpful and useful data for use by other computers, such as computer 1201. For example, in a hypothetical case where computer 1201 is designed and programmed to provide a recommendation based on historical data, then this historical data may be provided to computer 1201 from remote database 1230 of remote server 1204.

PUBLIC CLOUD 1205 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 1205 is performed by the computer hardware and/or software of cloud orchestration module 1241. The computing resources provided by public cloud 1205 are typically implemented by virtual computing environments that run on various computers making up the computers of host physical machine set 1242, which is the universe of physical computers in and/or available to public cloud 1205. The virtual computing environments (VCEs) typically take the form of virtual machines from virtual machine set 1243 and/or containers from container set 1244. It is understood that these VCEs may be stored as images and may be transferred among and between the various physical machine hosts, either as images or after instantiation of the VCE. Cloud orchestration module 1241 manages the transfer and storage of images, deploys new instantiations of VCEs and manages active instantiations of VCE deployments. Gateway 1240 is the collection of computer software, hardware, and firmware that allows public cloud 1205 to communicate through WAN 1202.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1206 is similar to public cloud 1205, except that the computing resources are only available for use by a single enterprise. While private cloud 1206 is depicted as being in communication with WAN 1202, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1205 and private cloud 1206 are both part of a larger hybrid cloud.

It should also be mentioned that the dependent task prioritization system 1100 for a prioritization of dependent task can be an operational sub-system of the computer 1201 and may be attached to a computer-internal bus system.

The terminology used herein is for the purpose of describing particular embodiments only and is not intended to limit the invention. As used herein, the singular forms a, an and the are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

In a nutshell, the inventive concept can be summarized by the following clauses:

1. A computer-implemented method for dependent task prioritization, the method comprising
   providing base data comprising
      task identifiers, wherein each task identifier is indicative of a respective task,
      failure values, wherein each failure value is indicative of a failure rate per time unit of a respective task, and
      dependency data values
      wherein each dependency data value is associated with a pair of tasks;
   generating, from the base data, a probabilistic model
      wherein the tasks and related dependency data values are associated with a directed acyclic graph, and
      wherein each task is associated with a network node of the directed acyclic graph, and
      wherein each dependency data value is associated with a network edge of the directed acyclic graph, wherein each dependency data value is indicative of a conditional probability in relation to the respective failure rate per time unit;
   determining for each task in the acyclic directed graph a posterior marginal probability value indicative of a probability of failure of the task; and
   selecting, based upon the posterior marginal probability values, a sequence of tasks that is likely to fail fastest.

2. The method according to clause 1, wherein the selecting the sequence of the tasks that is likely to fail fastest comprises
   selecting the sequence of the set of tasks having the highest sum of incremental failure probabilities between neighboring tasks.

3. The method according to clause 1 or 2, wherein the tasks are test tasks for a system under test.

4. The method according to any of the preceding clauses,
   wherein the tasks are project tasks, and
   wherein the failure rate per time unit is a risk value of a respective project task.

5. The method according to any of the preceding clauses,
   wherein the task is a service of a boot process of an operating system comprising a plurality of services, and
   wherein the failure rate per time unit represents a probability for failure to complete the service.

6. The method according to any of the preceding clauses, wherein the acyclic directed graph is a Bayesian network graph.

7. The method according to clause 6, also comprising
   building a search tree based on the acyclic directed graph.

8. The method according to clause 7, also comprising
   filtering branches of the directed acyclic graph using a Breadth-First-Search technique.

9. The method according to clause 7, wherein the building the search tree is using a k-nearest-neighbor technique.

10. The method according to any of the preceding clauses, also comprising
   creating for each node of the acyclic directed graph a conditional probability table using failure rate per time unit values.

11. A dependent task prioritization for dependent task prioritization, the system comprising
   one or more processors and a memory operatively coupled to the one or more processors, wherein the memory stores program code portions which, when executed by the one or more processors, enable the one or more processors to
   provide base data comprising
      task identifiers, wherein each task identifier is indicative of a respective task,
      failure values, wherein each failure value is indicative of a failure rate per time unit of a respective task, and
      dependency data values, wherein each dependency data value is associated with a pair of tasks;
   generate, from the base data, a probabilistic model, wherein the tasks and related dependency data values are associated with a directed acyclic graph, and
      wherein each task is associated with a network node of the directed acyclic graph, and
      wherein each dependency data value is associated with a network edge of the directed acyclic graph, wherein each dependency data value is indicative of a conditional probability in relation to the respective failure rate per time unit;
   determine for each task in the acyclic directed graph a posterior marginal probability value indicative of a probability of failure of the task; and
   select, based upon the posterior marginal probability values, a sequence of tasks that is likely to fail fastest.

12. The system according to clause 11, wherein the selecting the sequence of the tasks that is likely to fail fastest comprises
   selecting the sequence of the set of tasks having the highest sum of incremented failure probabilities between neighboring tasks.

13. The system according to clause 11 or 12, wherein the tasks are test tasks for a system under test.

14. The system according to any of the clauses 11 to 13,
   wherein the tasks are project tasks, and
   wherein the failure rate per time unit is a risk value of a respective project task.

15. The system according to any of the clauses 11 to 14,
   wherein the task is a service of a boot process of an operating system comprising a plurality of services, and
   wherein the failure rate per time unit represents a probability for failure to complete the service.

16. The system according to any of the clauses 11 to 15, wherein the acyclic directed graph is a Bayesian network graph.

17. The system according to clause 16, also comprising building a search tree based on the acyclic directed graph.

18. The system according to clause 17, also comprising filtering branches of the directed acyclic graph using the Breadth-First-Search technique.

19. The system according to any of the clauses 11 to 18, also comprising creating for each node of the acyclic directed graph a conditional probability table using failure rate per time unit values.

20. A computer program product for dependent task prioritization, the computer program product comprising a computer readable storage medium having program instructions embodied therewith, the program instructions being executable by one or more computing systems or controllers to cause the one or more computing systems to provide base data comprising task identifiers, wherein each task identifier is indicative of a respective task, failure values, wherein each failure value is indicative of a failure rate per time unit of a respective task, and dependency data values, wherein each dependency data value is associated with a pair of tasks;

generate, from the base data, a probabilistic model, wherein the tasks and related dependency data values are associated with a directed acyclic graph, and wherein each task is associated with a network node of the directed acyclic graph, and wherein each dependency data value is associated with a network edge of the directed acyclic graph, wherein each dependency data value is indicative of a conditional probability in relation to the respective failure rate per time unit;

determine for each task in the acyclic directed graph a posterior marginal probability value indicative of a probability of failure of the task; and select, based upon the posterior marginal probability values, a sequence of tasks that is likely to fail fastest.

What is claimed is:

1. A computer-implemented method for dependent task prioritization, said method comprising:

providing base data comprising:

task identifiers, wherein each task identifier is indicative of a respective task;

failure values, wherein each failure value is indicative of a failure rate per time unit of a respective task; and dependency data values wherein each dependency data value is associated with a pair of tasks;

generating, from said base data, a probabilistic model, wherein said tasks and related dependency data values are associated with a directed acyclic graph, and wherein each task is associated with a network node of said directed acyclic graph, and wherein each dependency data value is associated with a network edge of said directed acyclic graph, wherein each dependency data value is indicative of a conditional probability in relation to said respective failure rate per time unit;

determining for each task in said acyclic directed graph a posterior marginal probability value indicative of a probability of failure of said task; and selecting, based upon said posterior marginal probability values, a sequence of tasks that is likely to fail fastest.

2. The method according to claim 1, wherein said selecting said sequence of said tasks that is likely to fail fastest comprises:

selecting the sequence of said set of tasks having said highest sum of incremental failure probabilities between neighboring tasks.

3. The method according to claim 1, wherein said tasks are test tasks for a system under test.

4. The method according to claim 1, further comprising:

wherein said tasks are project tasks; and wherein said failure rate per time unit is a risk value of a respective project task.

5. The method according to claim 1, further comprising:

wherein said task is a service of a boot process of an operating system comprising a plurality of services, and wherein said failure rate per time unit represents a probability for failure to complete said service.

6. The method according to claim 1, wherein said acyclic directed graph is a Bayesian network graph.

7. The method according to claim 6, further comprising:

building a search tree based on said acyclic directed graph.

8. The method according to claim 7, further comprising:

filtering branches of said directed acyclic graph using a Breadth-First-Search technique.

9. The method according to claim 7, wherein said building said search tree is using a k-nearest-neighbor technique.

10. The method according to claim 1, further comprising:

creating for each node of said acyclic directed graph a conditional probability table using failure rate per time unit values.

11. A dependent task prioritization for dependent task prioritization, said system comprising:

one or more processors and a memory operatively coupled to said one or more processors, wherein said memory stores program code portions which, when executed by said one or more processors, enable said one or more processors to:

provide base data comprising:

task identifiers, wherein each task identifier is indicative of a respective task;

failure values, wherein each failure value is indicative of a failure rate per time unit of a respective task; and dependency data values wherein each dependency data value is associated with a pair of tasks;

generate, from said base data, a probabilistic model, wherein said tasks and related dependency data values are associated with a directed acyclic graph, and wherein each task is associated with a network node of said directed acyclic graph, and wherein each dependency data value is associated with a network edge of said directed acyclic graph, wherein each dependency data value is indicative of a conditional probability in relation to said respective failure rate per time unit;

determine for each task in said acyclic directed graph a posterior marginal probability value indicative of a probability of failure of said task; and select, based upon said posterior marginal probability values, a sequence of tasks that is likely to fail fastest.

12. The system according to claim 11, wherein said select said sequence of said tasks that is likely to fail fastest comprises:

selecting said sequence of said set of tasks having said highest sum of incremented failure probabilities between neighboring tasks.

13. The system according to claim 11, wherein said tasks are test tasks for a system under test.

14. The system according to claim 11, wherein said tasks are project tasks, and wherein said failure rate per time unit is a risk value of a respective project task.

15. The system according to claim 11, further comprising:

wherein said task is a service of a boot process of an operating system comprising a plurality of services; and wherein said failure rate per time unit represents a probability for failure to complete said service.

16. The system according to claim 11, wherein said acyclic directed graph is a Bayesian network graph.

17. The system according to claim 16, further comprising:

building a search tree based on said acyclic directed graph.

18. The system according to claim 17, further comprising:

filtering branches of said directed acyclic graph using said Breadth-First-Search technique.

19. The system according to claim 11, further comprising:

creating for each node of said acyclic directed graph a conditional probability table using failure rate per time unit values.

20. A computer program product for dependent task prioritization, said computer program product comprising a computer readable storage medium having program instructions embodied therewith, said program instructions being executable by one or more computing systems or controllers to cause said one or more computing systems to:

provide base data comprising:

task identifiers, wherein each task identifier is indicative of a respective task;

failure values, wherein each failure value is indicative of a failure rate per time unit of a respective task; and dependency data values wherein each dependency data value is associated with a pair of tasks;

generate, from said base data, a probabilistic model, wherein said tasks and related dependency data values are associated with a directed acyclic graph, and wherein each task is associated with a network node of said directed acyclic graph, and wherein each dependency data value is associated with a network edge of said directed acyclic graph, wherein each dependency data value is indicative of a conditional probability in relation to said respective failure rate per time unit;

determine for each task in said acyclic directed graph a posterior marginal probability value indicative of a probability of failure of said task; and select, based upon said posterior marginal probability values, a sequence of tasks that is likely to fail fastest.

* * * * *